US011934119B2

(12) United States Patent
Yamashita et al.

(10) Patent No.: US 11,934,119 B2
(45) Date of Patent: Mar. 19, 2024

(54) TRANSPORTATION DEVICE, FIXING DEVICE, AND IMAGE FORMING APPARATUS

(71) Applicant: FUJIFILM Business Innovation Corp., Tokyo (JP)

(72) Inventors: Masato Yamashita, Kanagawa (JP); Yoshiki Shimodaira, Kanagawa (JP); Kosuke Yamada, Kanagawa (JP); Tetsuro Kodera, Kanagawa (JP); Mitsuhiro Matsumoto, Kanagawa (JP); Takayuki Yamashita, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/465,869

(22) Filed: Sep. 3, 2021

(65) Prior Publication Data

US 2022/0075299 A1 Mar. 10, 2022

(30) Foreign Application Priority Data

Sep. 8, 2020 (JP) ................................ 2020-150740
Jul. 7, 2021 (JP) ................................ 2021-112907

(51) Int. Cl.
*G03G 15/20* (2006.01)

(52) U.S. Cl.
CPC ................................ *G03G 15/2028* (2013.01)

(58) Field of Classification Search
CPC ................................................ G03G 15/2028
See application file for complete search history.

(56) References Cited

U.S. PATENT DOCUMENTS

2017/0343942 A1 11/2017 Okamoto et al.
2018/0004131 A1 1/2018 Oikawa et al.
2020/0249596 A1 8/2020 Miyoshi et al.

FOREIGN PATENT DOCUMENTS

JP 2006259223 9/2006
JP 2017076079 A * 4/2017
JP 6229700 B2 * 11/2017 ......... G03G 15/2032

OTHER PUBLICATIONS

JP_2017076079_A_1 Machine Translation, Japan, 2017, Mito.*
JP_6229700_B2_1 Machine Translation, Saito, Japan, Nov. 2017.*
(Continued)

*Primary Examiner* — Victor Verbitsky
(74) *Attorney, Agent, or Firm* — JCIPRNET

(57) ABSTRACT

A transportation device includes a first transporter, a second transporter movable between a contact position and a separate position toward and away from the first transporter to hold a to-be-transported object between the second transporter and the first transporter in the contact position, and a transportation unit that transports the to-be-transported object to a nip area where the first transporter and the second transporter hold the to-be-transported object therebetween while the second transporter is located in the separate position. The second transporter moves from the separate position to the contact position to hold the to-be-transported object transported to the nip area by the transportation unit between the second transporter and the first transporter to transport the to-be-transported object.

14 Claims, 7 Drawing Sheets

(56) References Cited

OTHER PUBLICATIONS

"Search Report of Europe Counterpart Application", dated Jan. 18, 2022, p. 1-p. 8.
"Office Action of Australia Counterpart Application", dated Oct. 24, 2022, p. 1-p. 4.
"Office Action of Europe Counterpart Application", dated Feb. 1, 2024, pp. 1-5.

* cited by examiner

TRANSPORTATION DEVICE, FIXING DEVICE, AND IMAGE FORMING APPARATUS

CROSS-REFERENCE TO RELATED APPLICATIONS

This application is based on and claims priority under 35 USC 119 from Japanese Patent Application No. 2020-150740 filed Sep. 8, 2020, and Japanese Patent Application No. 2021-112907 filed Jul. 7, 2021.

BACKGROUND

(i) Technical Field

The present disclosure relates to a transportation device, a fixing device, and an image forming apparatus.

(ii) Related Art

Japanese Unexamined Patent Application Publication No. 2006-259223 discloses a fixing device that fixes an image drawn on a recording medium with particles containing at least resin onto the recording medium. The fixing device includes a pair of fixing rollers, a bonding unit, an electric charger, and a fixing unit. The pair of fixing rollers include a first fixing roller and a second fixing roller paired with the first fixing roller, at least one of which is a heating roller, and at least one of which has a replaceable surface layer. The bonding unit includes a bonding member that allows the recording medium to adhere thereto. The electric charger charges at least one of the recording medium and the bonding unit. The fixing unit physically fixes a leading end portion of a recording medium in a transportation direction with a gripper at a predetermined position of the bonding member. The electric charger causes the bonding member and the recording medium on which the image is drawn to electrostatically adhere to each other. The fixing unit fixes the leading end portion of the recording medium on which the image is drawn at a predetermined position of the bonding member. Then, the recording medium is transported together with the bonding unit while being held between the pair of fixing rollers to have the image fixed onto itself.

SUMMARY

A structure transports a to-be-transported object transported to between a first transporter (for example, a transport roller or a heating roller) and a second transporter (for example, a transport roller or a pressing roller) that are in contact with each other while holding the object between the first transporter and the second transporter. This structure may form creases in the to-be-transported object.

Aspects of non-limiting embodiments of the present disclosure relate to a structure that reduces creasing of a to-be-transported object further than a structure that transports a to-be-transported object transported to between a first transporter and a second transporter that are in contact with each other by holding the object between the first transporter and the second transporter.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a transportation device that includes a first transporter, a second transporter movable toward and away from the first transporter between a contact position and a separate position to hold a to-be-transported object between the second transporter and the first transporter in the contact position, and a transportation unit that transports the to-be-transported object to a nip area where the first transporter and the second transporter hold the to-be-transported object therebetween while the second transporter is located in the separate position, wherein the second transporter moves from the separate position to the contact position to hold the to-be-transported object transported to the nip area by the transportation unit between the second transporter and the first transporter to transport the to-be-transported object.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings.

First Exemplary Embodiment

Image Forming Apparatus 10

Figure 1:
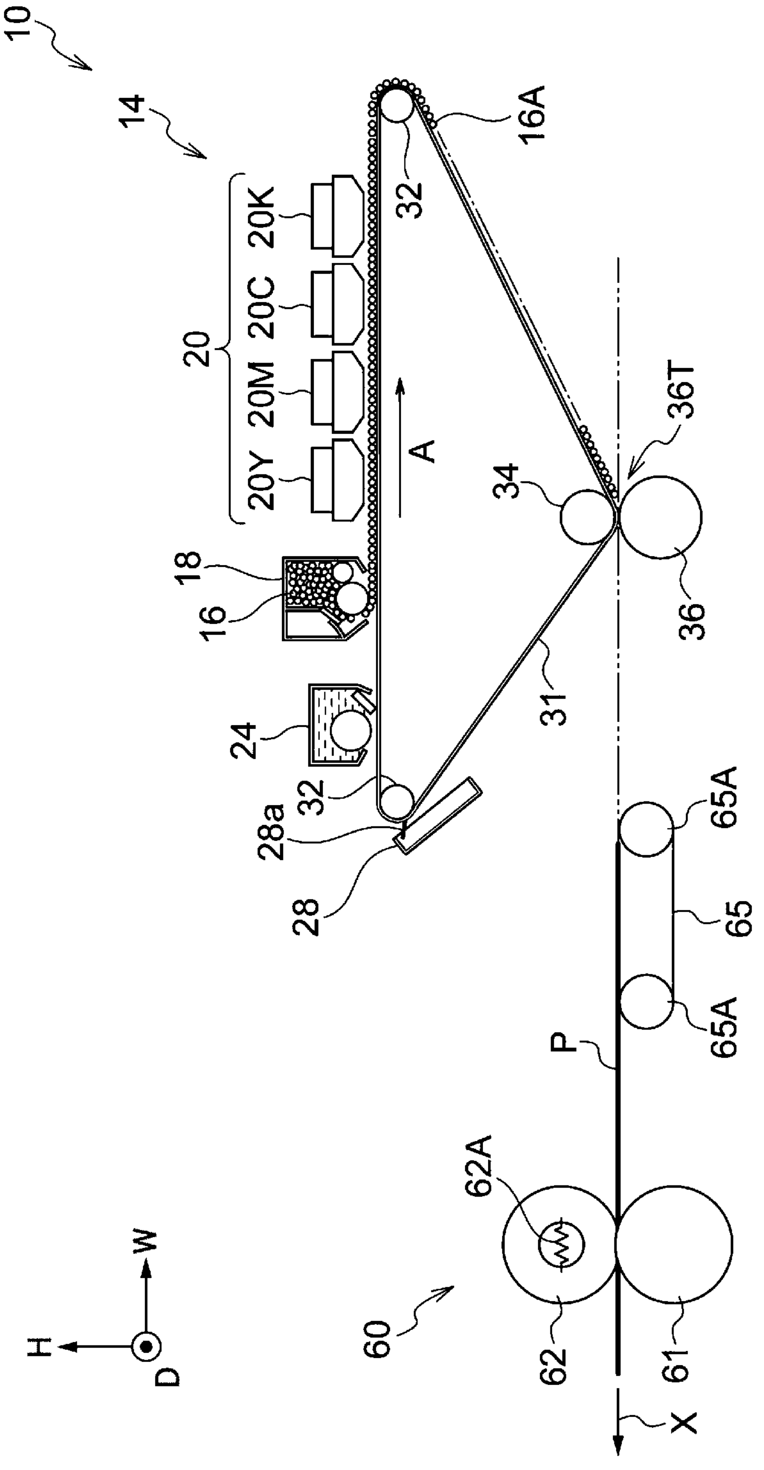
FIG. 1 is a schematic diagram of a structure of an image forming apparatus according to a first exemplary embodiment.

First, a structure of an image forming apparatus 10 according to a first exemplary embodiment will be described. FIG. 1 is a schematic diagram of a structure of the image forming apparatus 10 according to the present embodiment. Throughout the drawings, arrow H indicates a vertical direction or an apparatus up-down direction, arrow W indicates a horizontal direction or an apparatus width direction, and arrow D indicates an apparatus front-rear direction (apparatus depth direction). The dimensional ratios between components in the drawings in the H direction, the W direction, and the D direction may differ from the actual dimensional ratios.

The image forming apparatus 10 illustrated in FIG. 1 is an example of an image forming apparatus that forms an image on a recording medium. Specifically, the image forming apparatus 10 is an inkjet-image forming apparatus that forms an ink image on a recording medium P. The recording medium P is an example of a to-be-transported object, and the ink image is an example of an image.

More specifically, the image forming apparatus 10 includes an image forming unit 14 and a fixing device 60. Components (the image forming unit 14 and the fixing device 60) in the image forming apparatus 10 will be described below.

Image Forming Unit 14

The image forming unit 14 forms an ink image on a recording medium P. More specifically, the image forming unit 14 includes a transfer belt 31 serving as an intermediate transfer body, multiple rollers 32, an opposing roller 34, an adhesive-layer forming device 24, a particle feeder 18, ejection heads 20, a transfer roller 36, and a cleaner 28.

As illustrated in FIG. 1, the transfer belt 31 is endless, and wound around the multiple rollers 32 and the opposing roller 34 to form an inverted triangle when viewed from the front (that is, when viewed in the apparatus depth direction). The transfer belt 31 rotates in the direction of arrow A as a result of at least one of the multiple rollers 32 driving to rotate.

The adhesive-layer forming device 24, the particle feeder 18, the ejection heads 20, the transfer roller 36, and the cleaner 28 are arranged in this order around the transfer belt 31 in the direction in which the transfer belt 31 rotates (hereinafter referred to as “a belt rotation direction”).

More specifically, the adhesive-layer forming device 24 is disposed at an end portion of a horizontal portion of the inverted-triangle transfer belt 31 on one side (on the left side in the drawing) in the apparatus width direction. The adhesive-layer forming device 24 accommodates an adhesive. The adhesive is applied to an outer peripheral surface of the rotating transfer belt 31 to form an adhesive layer, not illustrated. Examples of the adhesive include glue and an organic solvent.

The particle feeder 18 is disposed downstream (on the right side) of the adhesive-layer forming device 24 in the belt rotation direction at the horizontal portion of the transfer belt 31. The particle feeder 18 accommodates ink receptive particles 16 capable of receiving ink droplets, and feeds the ink receptive particles 16 to the transfer belt 31 on which the adhesive layer is formed. Thus, the ink receptive particles 16 fed to the transfer belt 31 by the particle feeder 18 adhere to the adhesive layer with adhesive power of the adhesive layer. Thus, an ink-receptive particle layer 16A is formed on the transfer belt 31.

Multiple ejection heads 20 are disposed downstream (on the right side) of the particle feeder 18 in the belt rotation direction at the horizontal portion of the transfer belt 31. The ejection heads 20 are disposed to form ink images of different colors. The present exemplary embodiment includes the ejection heads 20 for four colors including yellow (Y), magenta (M), cyan (C), and black (K). The signs Y, M, C, and K appended to the reference sign 20 in FIG. 1 indicate the respective colors of the components.

The ejection head 20 for each color ejects ink droplets through a nozzle (not illustrated) to the ink-receptive particle layer 16A with a known method such as a thermal method or a piezoelectric method to form an ink image based on image data. The ink droplets ejected from the ejection head 20 for each color are received on the ink-receptive particle layer 16A to form an ink image.

The transfer roller 36 is disposed below the transfer belt 31 to face the transfer belt 31. More specifically, the transfer roller 36 forms a nip area 36T by holding the transfer belt 31 between itself and the opposing roller 34.

In the present exemplary embodiment, rotation of the transfer belt 31 transports the ink image formed on the ink-receptive particle layer 16A to the nip area 36T, and the transport mechanism (not illustrated) transports the recording medium P to the nip area 36T. Each drawing illustrates a transport path along which the recording medium P is transported with a two-dot chain line, and indicates the transport direction of the recording medium P with arrow X.

The transfer roller 36 holds and presses the recording medium P and the ink image transported to the nip area 36T with the transfer belt 31 to transfer the ink image to the recording medium P.

When holding and pressing the recording medium P and the ink image at the nip area 36T with the transfer belt 31, the transfer roller 36 may heat the recording medium P and the ink image.

The cleaner 28 is disposed downstream of the nip area 36T in the belt rotation direction, and upstream of the adhesive-layer forming device 24 in the belt rotation direction. The cleaner 28 includes a blade 28*a* that is in contact with the outer peripheral surface of the transfer belt 31. With the rotation of the transfer belt 31, the cleaner 28 removes, with the blade 28*a*, an adhesive layer, the ink receptive particles 16, ink, and other foreign matter (such as paper dust from a recording medium P formed from of paper) left on the portion of the transfer belt 31 that has passed the nip area 36T.

Fixing Device 60

Figure 2:
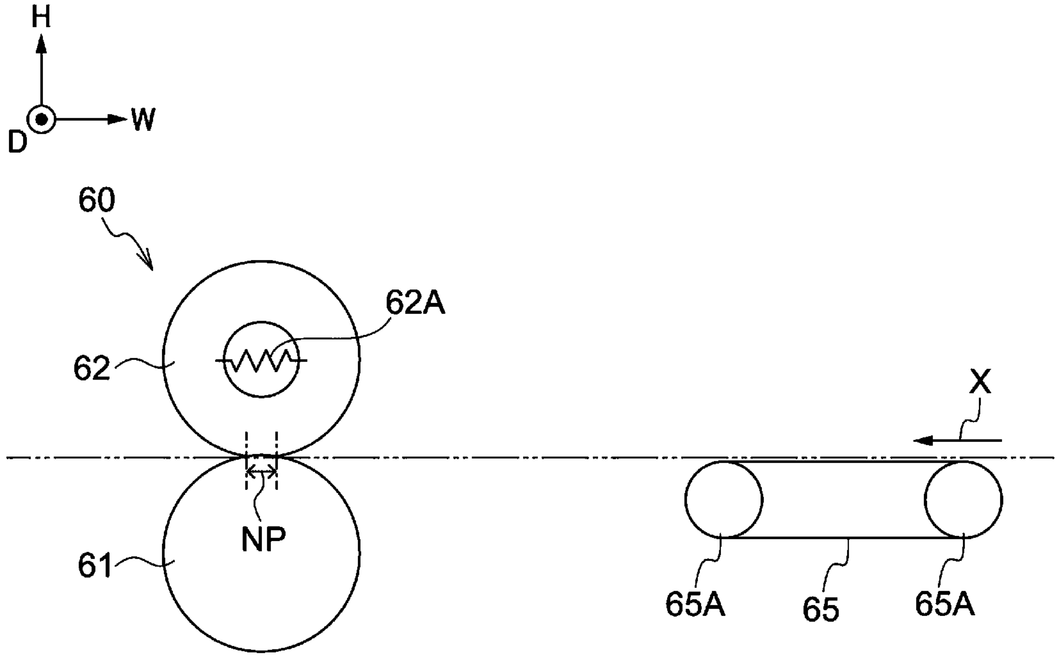
FIG. 2 is a schematic diagram of a structure of a fixing device according to the first exemplary embodiment.

The fixing device 60 illustrated in FIG. 1 is a device that fixes an ink image transferred to the recording medium P onto the recording medium P, and is an example of a transportation device. More specifically, as illustrated in FIG. 2, the fixing device 60 includes a transport belt 65, a pressing roller 61, and a heating roller 62. The transport belt 65 is an example of a transportation unit. The pressing roller 61 is an example of a first transporter, and an example of a pressing member. The heating roller 62 is an example of a second transporter, and an example of a heating member.

The pressing roller 61 and the heating roller 62 are vertically arranged. More specifically, the heating roller 62 is disposed above the pressing roller 61. The heating roller 62 includes a heat source 62A such as a halogen lamp inside the roller.

In the present exemplary embodiment, for example, one of the pressing roller 61 and the heating roller 62 drives to rotate, and the other one of the pressing roller 61 and the heating roller 62 is driven to rotate. Instead, both the pressing roller 61 and the heating roller 62 may drive to rotate.

Figure 3:
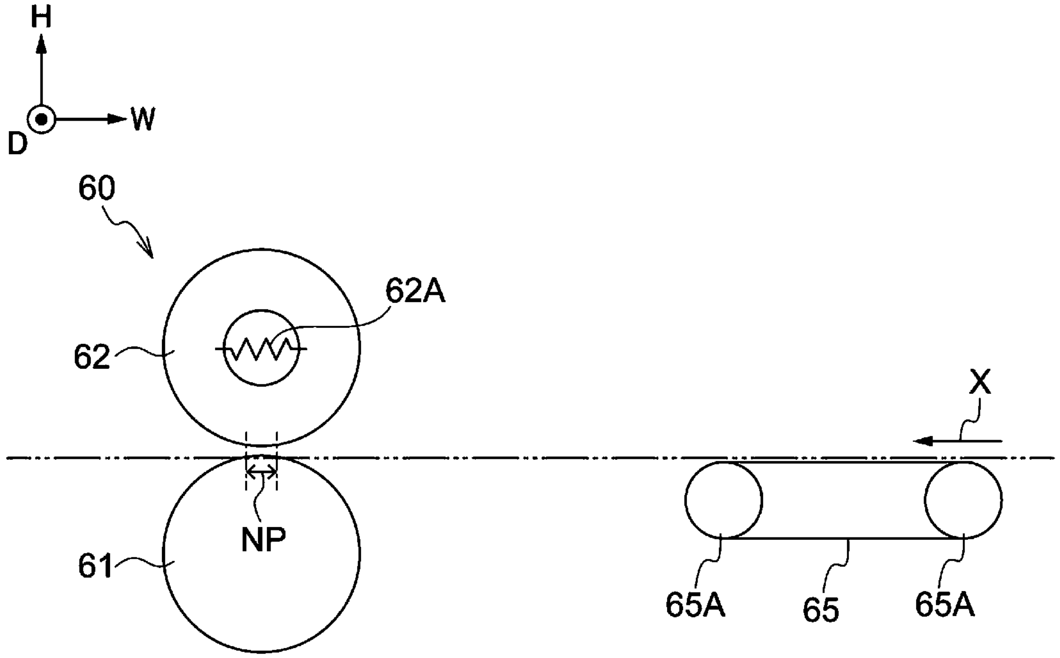
FIG. 3 is a schematic diagram of a state where a heating roller is located at a separate position apart from a pressing roller in the structure illustrated in FIG. 2.

The heating roller 62 is movable toward and away from the pressing roller 61 between a contact position (the position illustrated in FIG. 2) and a separate position (the position illustrated in FIG. 3). More specifically, the heating roller 62 is moved by a movement mechanism (referred to as a movement mechanism A below) including components such as a cam between the contact position (the position illustrated in FIG. 2) and the separate position (the position illustrated in FIG. 3). In other words, the heating roller 62 is pushed to or pulled from the contact position with, for example, elastic force of an elastic member (such as a spring) of the movement mechanism A, and is moved to the separate position with the cam of the movement mechanism A against the elastic force.

Figure 6:
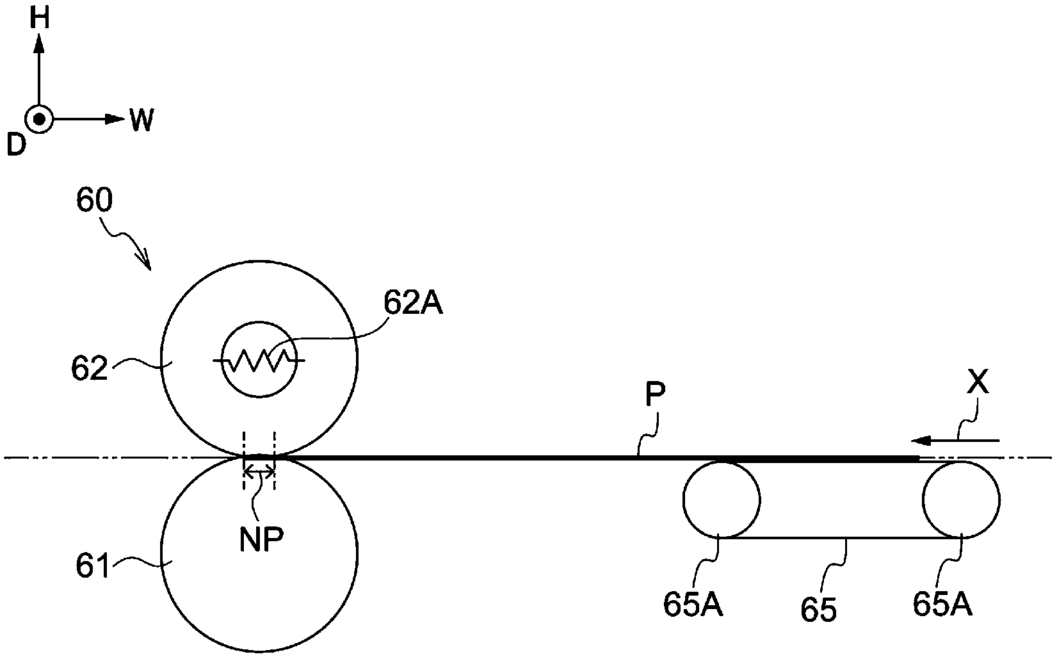
FIG. 6 is a schematic diagram of a state where the heating roller and the pressing roller hold a recording medium transported to the nip area therebetween in the structure illustrated in FIG. 5.

As illustrated in FIG. 6, the heating roller 62 holds the recording medium P between itself and the pressing roller 61 in the contact position. Each drawing illustrates the nip area NP where the pressing roller 61 and the heating roller 62 hold a recording medium P therebetween. The nip area NP has a width in the transport direction X. As will be described later, the recording medium P transported to the nip area NP is held between the pressing roller 61 and the heating roller 62 in the nip area NP. Thus, the nip area NP is an area where the pressing roller 61 and the heating roller 62 are to hold a recording medium P therebetween.

The transport belt 65 is a transportation unit that transports the recording medium P while coming into contact with a non-transfer surface of the recording medium P without coming into contact with a transfer surface of the recording medium P. More specifically, the transport belt 65 is formed from an annular belt wound around a pair of rollers 65A. The transport belt 65 transports the recording medium P by, for example, attracting the recording medium P to the belt with suction force caused by a negative pressure or electrostatic force. The transfer surface of the recording medium P is a surface to which an image is to be transferred, and the non-transfer surface is a surface opposite to the transfer surface. Guides, not illustrated, that guides the recording medium P are disposed between the nip area 36T and the transport belt 65 and between the transport belt 65 and the nip area NP.

Figure 4:
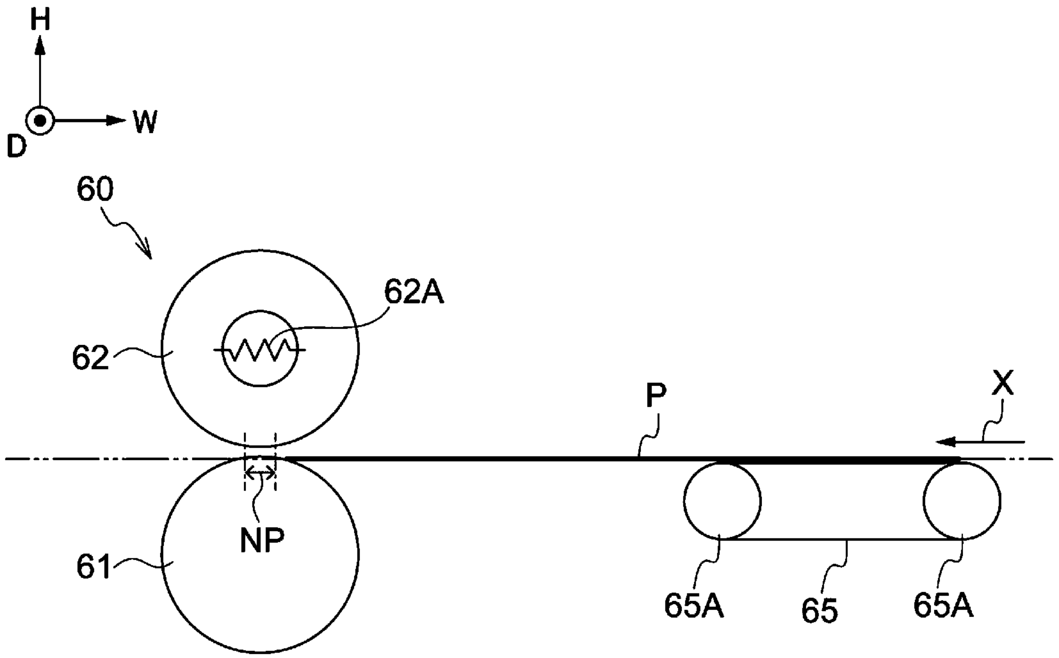
FIG. 4 is a schematic diagram of a state where a transport belt transports a recording medium to a position in front of a nip area in the structure illustrated in FIG. 3.
Figure 5:
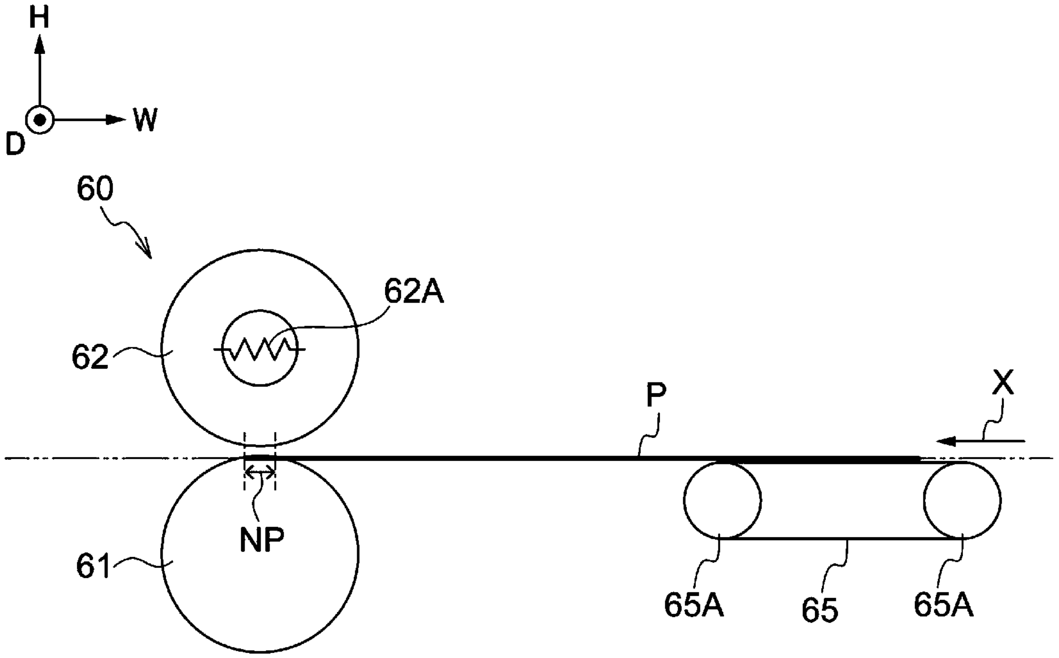
FIG. 5 is a schematic diagram of a state where a transport belt transports a recording medium to the nip area in the structure illustrated in FIG. 3.

In the present exemplary embodiment, as illustrated in FIG. 4 and FIG. 5, the transport belt 65 transports the recording medium P to the nip area NP while the heating roller 62 is in the separate position. More specifically, as illustrated in FIG. 4 and FIG. 5, the transport belt 65 transports the leading end portion of the recording medium P to the nip area NP while allowing the recording medium P to follow the profile of the pressing roller 61. Specifically, the transport belt 65 transports the recording medium P to the nip area NP via the outer periphery of the pressing roller 61. For example, the transport belt 65 stops after transporting the recording medium P to the nip area NP. More specifically, the transport belt 65 stops the recording medium P within a period from when the leading end portion of the recording medium P enters the nip area NP to when the leading end portion finishes passing the nip area NP. In other words, the transport belt 65 stops the recording medium P in the state where the leading end portion of the recording medium P is located in the nip area NP. When the leading end portion of the recording medium P enters the nip area NP, for example, the heating roller 62 and the pressing roller 61 are stationary without rotating.

Transportation of the recording medium P to the nip area NP is detected using, for example, the time that has elapsed after a detector (more specifically, a sensor) disposed upstream of the nip area NP in the transport direction detects the leading end portion of the recording medium P.

Figure 7:
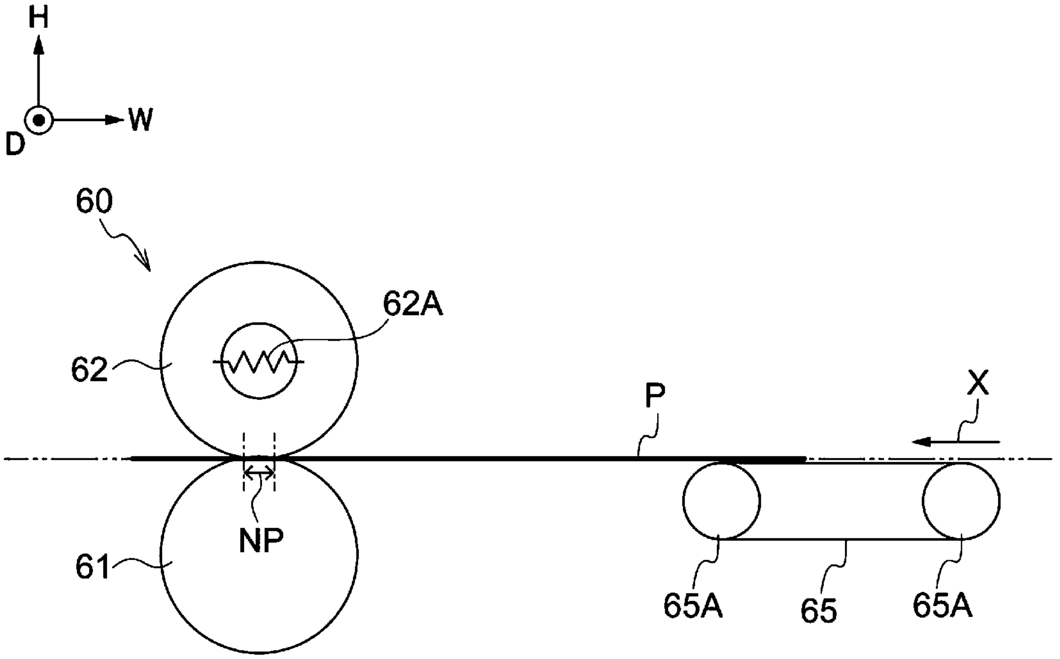
FIG. 7 is a schematic diagram of a state where the heating roller and the pressing roller transport a recording medium held therebetween in the structure illustrated in FIG. 6.

The heating roller 62 moves from the separate position to the contact position to hold the recording medium P transported by the transport belt 65 to the nip area NP between itself and the pressing roller 61 as illustrated in FIG. 6. More specifically, the heating roller 62 holds the recording medium P between itself and the pressing roller 61 within a period from when the leading end portion of the recording medium P enters the nip area NP to when the leading end portion finishes passing the nip area NP. In other words, the heating roller 62 holds the recording medium P between itself and the pressing roller 61 in the state where the leading end portion of the recording medium P is located in the nip area NP. As illustrated in FIG. 7, the pressing roller 61 and the heating roller 62 start rotating to transport the recording medium P while holding the recording medium P therebetween.

In the fixing device 60, the heating roller 62 and the pressing roller 61 heat and press the recording medium P while holding the recording medium P therebetween to transport the recording medium P. Thus, the ink image transferred to the recording medium P is fixed to the recording medium P.

After transporting the recording medium P, the heating roller 62 moves from the contact position (the position illustrated in FIG. 2) to the separate position (the position illustrated in FIG. 3). More specifically, the heating roller 62 moves from the contact position to the separate position after finishing transporting the recording medium P (in other words, after finishing fixing an image onto the recording medium P), and before the leading end portion of a recording medium P subsequently transported to the nip area NP enters the nip area NP.

Thus, in the present exemplary embodiment, the heating roller 62 moves from the separate position to the contact position when holding the recording medium P between itself and the pressing roller 61, and moves from the contact position to the separate position when finishing transportation of the recording medium P. A first movement speed at which the heating roller 62 moves from the separate position to the contact position is higher than a second movement speed at which the heating roller 62 moves from the contact position to the separate position. In other words, the heating roller 62 is moved by the movement mechanism A from the separate position to the contact position at the first movement speed higher than the second movement speed. In other words, the time taken for the heating roller 62 to move from the separate position to the contact position is shorter than the time taken for the heating roller 62 to move from the contact position to the separate position.

The movement mechanism A includes a support member (not illustrated) that supports the heating roller 62 or a cam follower (not illustrated) disposed on the heating roller 62, and a cam (not illustrated) including a short-diameter portion and a long-diameter portion having a length in the radial direction from the rotation center larger than that of the short-diameter portion. In the movement mechanism A, for example, a rotation of a cam in a predetermined rotation direction brings the outer peripheral surface of the cam into contact with the cam follower over a range (referred to as a range X below) from the short-diameter portion to the long-diameter portion to move the heating roller 62 from the contact position to the separate position. In the movement mechanism A, for example, when the rotation of the cam in the rotation direction brings the outer peripheral surface of the cam into contact with the cam follower over the range (referred to as a range Y below) from the long-diameter portion to the short-diameter portion to move the heating roller 62 from the separate position to the contact position. In this structure, for example, the range X is longer than the range Y on the outer peripheral surface of the cam, and the change of the radial dimension in the range X from the short-diameter portion to the long-diameter portion is less steep than the change of the radial dimension in the range Y from the long-diameter portion to the short-diameter portion. Thus, the heating roller 62 moves from the separate position to the contact position at the first movement speed higher than the second movement speed.

On the outer peripheral surface of the cam, the range X and the range Y may have the same length, and the change of the radial dimension in the range X from the short-diameter portion to the long-diameter portion may be the same as the change of the radial dimension in the range Y from the long-diameter portion to the short-diameter portion. In this structure, for example, the rotation speed of the cam when the range Y comes into contact with the cam follower is higher than the rotation speed of the cam when the range X comes into contact with the cam follower. Thus, the heating roller 62 moves from the separate position to the contact position at the first movement speed higher than the second movement speed.

In the present exemplary embodiment, the heating roller 62 holds a recording medium P formed from an ordinary paper sheet (that is, not formed from a coated paper sheet) between itself and the pressing roller 61 at a first load, and holds a recording medium P formed from a coated paper sheet between itself and the pressing roller 61 at a second load heavier than the first load. In the present exemplary embodiment, the heating roller 62 holds the recording medium P formed from a coated paper sheet between itself and the pressing roller 61 at the second load regardless of the basis weight of the recording medium P. An ordinary paper sheet is a sheet on which no coated layer is formed.

In the present exemplary embodiment, for example, whether the recording medium P has a coated layer is detected by an input from a user of the fixing device 60 or a detector such as an optical sensor to determine whether the recording medium P is a coated paper sheet. Based on this determination, the present exemplary embodiment selects the first load or the second load as the load of the heating roller 62.

In the present exemplary embodiment, the heating roller 62 holds the recording medium P formed from an ordinary paper sheet with a basis weight of smaller than a predetermined reference value between itself and the pressing roller 61 at the first load. The heating roller 62 holds the recording medium P formed from an ordinary paper sheet with a basis weight of larger than or equal to the predetermined reference value between itself and the pressing roller 61 at the second load.

In the present exemplary embodiment, for example, the basis weight of the recording medium P is detected by an input from a user of the fixing device 60 or a detector such as an ultrasonic sensor to determine whether the recording medium P has a basis weight of larger than or equal to a reference value. Based on this determination, the present exemplary embodiment selects the first load or the second load as the load of the heating roller 62.

In the present exemplary embodiment, the movement mechanism A changes the contact position in the short-diameter portion of the cam where the movement mechanism A comes into contact with the cam follower by changing the rotation angle of the cam to adjust the load of the heating roller 62. More specifically, in the movement mechanism A, when a smallest-diameter portion in the short-diameter portion of the cam having a smallest radial dimension comes into contact with the cam follower, the heating roller 62 imposes the second load as its load. In the movement mechanism A, when the portion in the short-diameter portion of the cam having a radial dimension larger than the smallest-diameter portion comes into contact with the cam follower, the heating roller 62 imposes the first load as its load.

The present exemplary embodiment does not change the load of the heating roller 62 depending on the size of the recording medium P. Thus, the heating roller 62 holds the recording medium P formed from a coated paper sheet between itself and the pressing roller 61 at the second load regardless of the size of the recording medium P. The heating roller 62 holds the recording medium P formed from an ordinary paper sheet with a basis weight of larger than or equal to the predetermined reference value between itself and the pressing roller 61 at the second load regardless of the size of the recording medium P. The heating roller 62 holds the recording medium P formed from an ordinary paper sheet with a basis weight of smaller than a predetermined reference value between itself and the pressing roller 61 at the first load regardless of the size of the recording medium P.

At least one of the pressing roller 61 and the heating roller 62 is formed from an elastic body that is elastically deformed with the load imposed when the heating roller 62 and the pressing roller 61 hold the recording medium P therebetween. In the present exemplary embodiment, both the pressing roller 61 and the heating roller 62 are formed from, for example, rubber rollers (an example of an elastic body) each having a rubber layer on the outer periphery of the roller.

Operation of Present Exemplary Embodiment

As illustrated in FIG. 1, in the image forming apparatus 10, the adhesive-layer forming device 24 applies an adhesive to the outer peripheral surface of the rotating transfer belt 31 to form an adhesive layer not illustrated. Subsequently, the particle feeder 18 feeds the ink receptive particles 16 onto the transfer belt 31 to form the ink-receptive particle layer 16A on the adhesive layer of the transfer belt 31.

Subsequently, each ejection head 20 ejects ink droplets onto the ink-receptive particle layer 16A to form an ink image. The ink image formed on the ink-receptive particle layer 16A is transported to the nip area 36T by the rotation of the transfer belt 31, and the recording medium P is transported to the nip area 36T by the transport mechanism (not illustrated).

The transfer roller 36 holds the recording medium P and the ink image transported to the nip area 36T between itself and the transfer belt 31 to apply pressure on the recording medium P and the ink image to transfer the ink image to the recording medium P.

As illustrated in FIG. 4 and FIG. 5, the recording medium P to which the ink image is transferred is transported to the nip area NP with the transport belt 65 while the heating roller 62 is located in the separate position. In the present exemplary embodiment, as illustrated in FIG. 4, after having the leading end portion coming into contact with the pressing roller 61 first, the recording medium P is transported along the pressing roller 61 to the nip area NP.

Subsequently, as illustrated in FIG. 6, the heating roller 62 moves from the separate position to the contact position, and holds the recording medium P transported to the nip area NP by the transport belt 65 between itself and the pressing roller 61. As illustrated in FIG. 7, the pressing roller 61 and the heating roller 62 start rotating to transport the recording medium P while holding the recording medium P therebetween.

The heating roller 62 and the pressing roller 61 heat and presses the recording medium P while holding the recording medium P therebetween to transport the recording medium P. Thus, the heating roller 62 and the pressing roller 61 fix the ink image transferred to the recording medium P onto the recording medium P.

Figure 8:
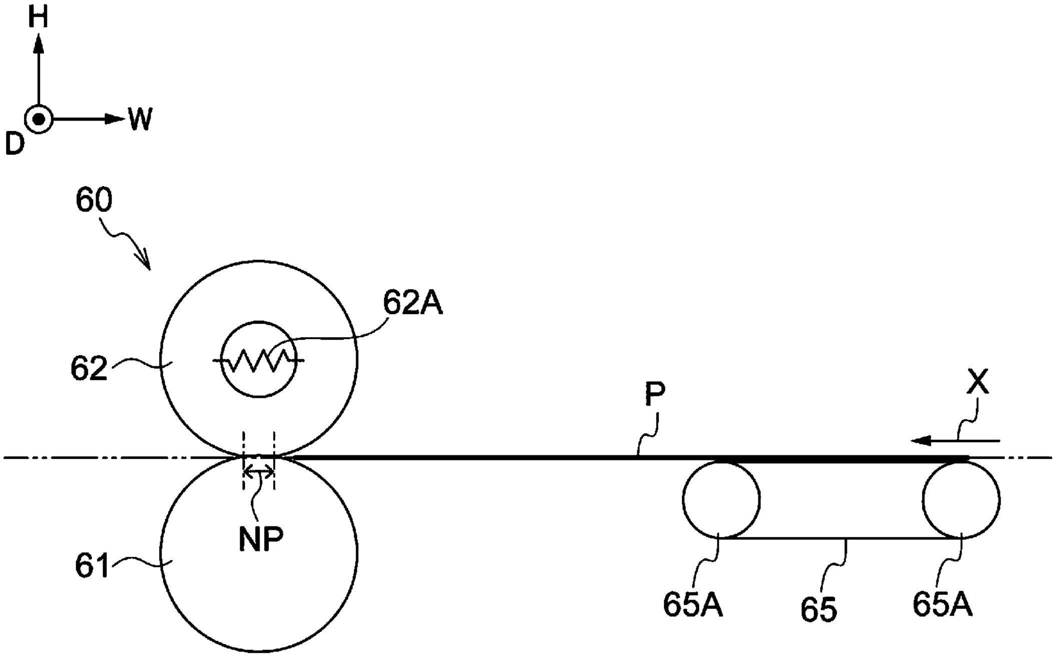
FIG. 8 is a schematic diagram of a structure (comparative example) where a recording medium is transported to between a heating roller and a pressing roller while the heating roller and the pressing roller are in contact with each other.
Figure 9:
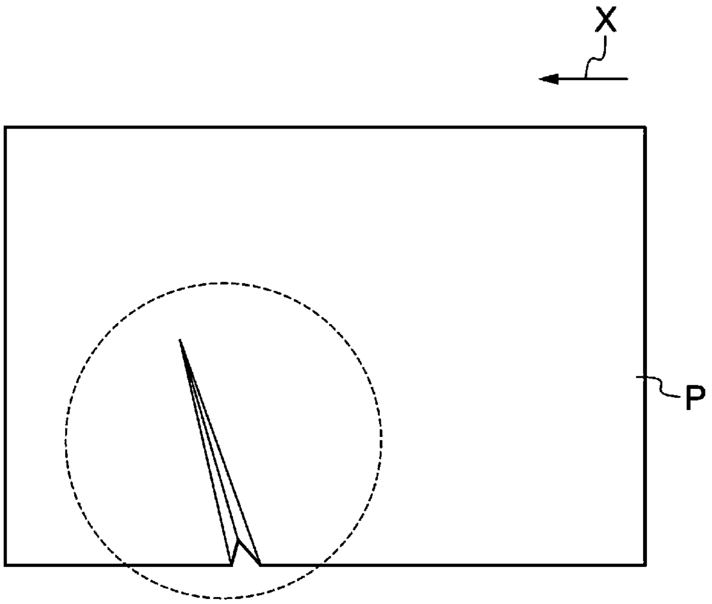
FIG. 9 is a schematic diagram of a state where a recording medium transported by the structure illustrated in FIG. 8 has a crease.

As illustrated in FIG. 8, in a structure (referred to as "a first structure" below) of transporting a recording medium P transported to between the pressing roller 61 and the heating roller 62 that are in contact with each other by holding the recording medium P between the pressing roller 61 and the heating roller 62, the position of the recording medium P is constrained when the leading end portion of the recording medium P enters between the pressing roller 61 and the heating roller 62. For example, when the recording medium P enters between the pressing roller 61 and the heating roller 62 while having a cockle or inclined with respect to the transport direction X, the recording medium P with a cockle or inclined is held between the pressing roller 61 and the heating roller 62 as it is. Thus, the recording medium P may have a crease as illustrated in FIG. 9. Particularly, a recording medium P formed from a thin paper sheet is more likely to have a crease.

In the present exemplary embodiment, as illustrated in FIG. 4 and FIG. 5, the transport belt 65 transports the recording medium P to the nip area NP while the heating roller 62 is located in the separate position. The heating roller 62 moves from the separate position to the contact position to hold the recording medium P transported to the nip area NP by the transport belt 65 between itself and the pressing roller 61, as illustrated in FIG. 6. As illustrated in FIG. 7, the pressing roller 61 and the heating roller 62 transport the recording medium P while holding the recording medium P therebetween.

Thus, the recording medium P is transported to the nip area NP while the heating roller 62 is located in the separate position, and thus the position of the recording medium P is prevented from being constrained when the leading end portion of the recording medium P enters between the pressing roller 61 and the heating roller 62. Thus, the recording medium P with a cockle or inclined with respect to the transport direction X may be restored. Thus, the structure according to the present exemplary embodiment reduces creases in the recording medium P further than in the first structure.

In the present exemplary embodiment, the heating roller 62 disposed above the pressing roller 61 moves between the contact position and the separate position. In a structure (referred to as "a second structure" below) where the pressing roller 61 disposed below moves between the contact position and the separate position, when the pressing roller 61 moves from the separate position to the contact position to hold the recording medium P, the recording medium P on the pressing roller 61 may move and have its position changed while being held by the pressing roller 61. This may cause creases in the recording medium P.

In contrast, in the present exemplary embodiment, as described above, the heating roller 62 disposed above the pressing roller 61 moves between the contact position and the separate position. This structure is less likely to move the recording medium P on the pressing roller 61 than in the second structure. Thus, the recording medium P is less likely to have its position changed while being held. Thus, this structure reduces creases in the recording medium P further than in the second structure.

In the present exemplary embodiment, the heating roller 62 holds the recording medium P between itself and the pressing roller 61 within a period from when the leading end portion of the recording medium P enters the nip area NP to when the leading end portion finishes passing the nip area NP. Thus, the heating roller 62 and the pressing roller 61 start transporting the recording medium P from when holding the leading end portion of the recording medium P therebetween. Thus, an image is allowed to be fixed to the recording medium P from the leading end portion of the recording medium P.

In the present exemplary embodiment, the first movement speed at which the heating roller 62 moves from the separate position to the contact position is higher than the second movement speed at which the heating roller 62 moves from the contact position to the separate position. Thus, for example, regardless of when the first end portion and the second end portion, in the axial direction, of the heating roller 62 come into contact with the recording medium P at different timings due to the heating roller 62 being, for example, inclined with respect to the pressing roller 61, the difference in timing is reduced further than that in the structure where the first movement speed is the same as the second movement speed. Thus, the time for which the load is imposed in an unbalanced manner on one side of the recording medium P is reduced, and thus, creases formed in the recording medium P are reduced.

In the present exemplary embodiment, the second movement speed is lower than the first movement speed. Thus, in the range X on the outer peripheral surface of the cam from the short-diameter portion to the long-diameter portion, the change of the radial dimension from the short-diameter portion to the long-diameter portion becomes less steep than that in the range Y on the outer peripheral surface of the cam from the long-diameter portion to the short-diameter portion. Thus, when the heating roller 62 is moved from the contact position to the separate position, noises caused by the cam and the cam follower are reduced.

In the present exemplary embodiment, both the pressing roller 61 and the heating roller 62 are formed from, for example, rubber rollers (an example of an elastic body) each having a rubber layer on the outer periphery of the roller. Compared to a structure where both the pressing roller 61 and the heating roller 62 are formed from solid bodies not elastically deformable, rubber rollers absorb an impact exerted when the heating roller 62 and the pressing roller 61 hold the recording medium P therebetween.

In the present exemplary embodiment, the heating roller 62 holds the recording medium P formed from an ordinary paper sheet between itself and the pressing roller 61 at the first load, and holds the recording medium P formed from a coated paper sheet between itself and the pressing roller 61 at the second load heavier than the first load. Thus, compared to a structure where the heating roller 62 holds the recording medium P formed from a coated paper sheet between itself and the pressing roller 61 at the first load, the quantity of heat provided to the recording medium P increases, and the gloss of the recording medium P is improved.

In the present exemplary embodiment, the heating roller 62 holds the recording medium P formed from an ordinary paper sheet with a basis weight of smaller than a predetermined reference value between itself and the pressing roller 61 at the first load, and holds the recording medium P formed from an ordinary paper sheet with a basis weight of larger than or equal to the predetermined reference value between itself and the pressing roller 61 at the second load. Thus, compared to a structure where the heating roller 62 holds the recording medium P with a basis weight of larger than or equal to the predetermined reference value between itself and the pressing roller 61 at the first load, the quantity of heat provided to the recording medium P increases, and fixing failures on the recording medium P are reduced.

Modification Example of Transportation device

In the present exemplary embodiment, the fixing device 60 having the transport function and the fixing function has been described as an example of a transportation device, but this is not the only possible example. For example, a device having a function other than the transport function and the fixing function (such as a transfer function) or a transportation device having only a transport function may be used as an example of the transportation device.

Modification Examples of First Transporter and Second Transporter

In the present exemplary embodiment, the pressing roller 61 is used as an example of the first transporter, but this is not the only possible example. A pressing belt wound around multiple rollers may be used as an example of the first transporter.

Figure 10:
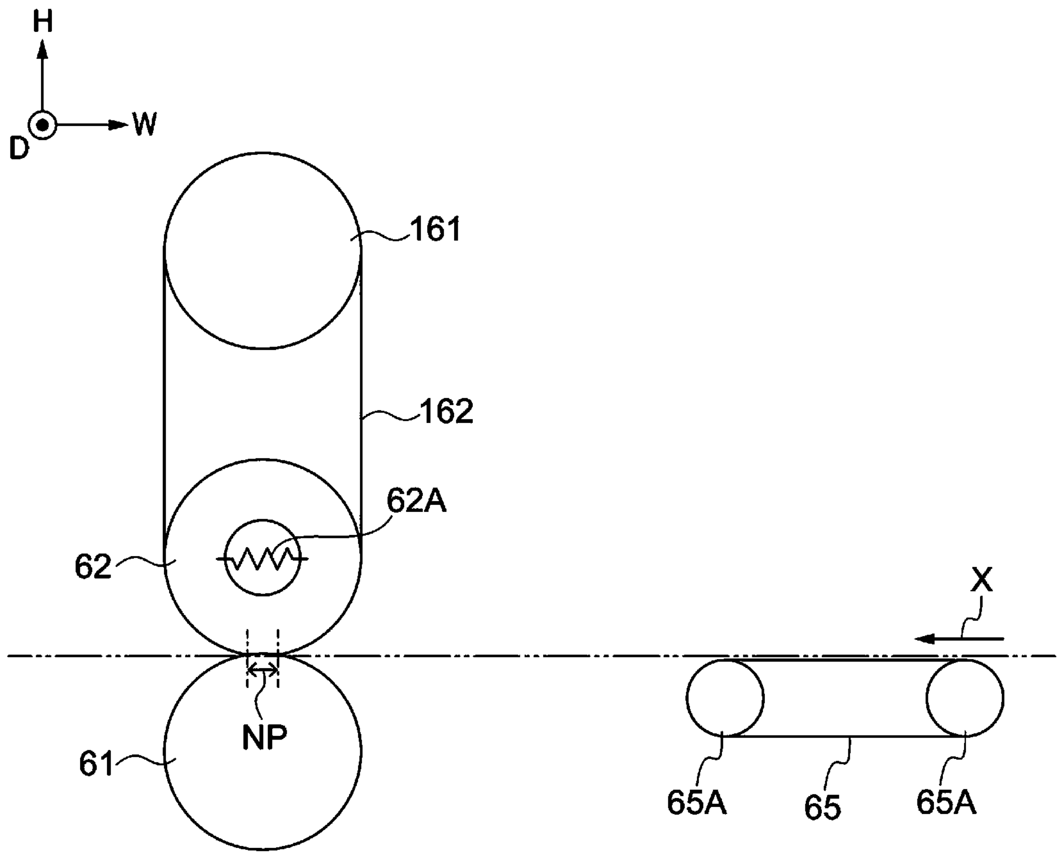
FIG. 10 is a schematic diagram of a modification example including a heating belt in place of a heating roller.

In the present exemplary embodiment, the heating roller 62 is used as an example of the second transporter, but this is not the only possible example. As illustrated in FIG. 10, for example, a heating belt 162 wound around the heating roller 62 and a roller 161 may be used as an example of the second transporter.

A heating member such as a heating roller or a heating belt may be used as an example of the first transporter, and a pressing member such as a pressing roller or a pressing belt may be used as an example of the second transporter.

When a device having the transport function and the transfer function is used as an example of the transportation device, a transfer member such as a transfer roller or a transfer belt and an opposing member such as an opposing roller or an opposing belt that opposes the transfer member may be used as examples of the first transporter and the second transporter.

When a transportation device having only the transport function is used as an example of the transportation device, a first transport member such as a transport roller or a transport belt and a second transport member such as a transport roller or a transport belt opposing the first transport member may be used as examples of the first transporter and the second transporter.

In the present exemplary embodiment, the pressing roller 61 serving as an example of the first transporter and the heating roller 62 serving as an example of the second transporter are formed from rubber rollers (an example of an elastic body) each having a rubber layer on the outer periphery of the roller, but this is not the only possible example. Only one of the pressing roller 61 and the heating roller 62 may be formed from an elastic body such as a rubber roller, or at least one of the pressing roller 61 and the heating roller 62 may be formed from an elastic body.

In the present exemplary embodiment, one of the pressing roller 61 and the heating roller 62 drives to rotate, and the other one is driven to rotate, but this is not the only possible example. As described above, both the pressing roller 61 and the heating roller 62 may drive to rotate. In this structure, for example, while the heating roller 62 is located in the separate position, the pressing roller 61 and the heating roller 62 rotate and the transport belt 65 transports the recording medium P to the nip area NP with this rotation. Thus, the recording medium P receives transportation force from the pressing roller 61.

While both the heating roller 62 and the pressing roller 61 are rotating, the heating roller 62 moves from the separate position to the contact position to hold the recording medium P between itself and the pressing roller 61. In the present exemplary embodiment, the heating roller 62 and the pressing roller 61 hold the recording medium P therebetween while the pressing roller 61 transports the recording medium P. At this time, besides the pressing roller 61, the transport belt 65 may transport the recording medium P. The heating roller 62 and the pressing roller 61 drive to rotate with, for example, driving force transmitted to their rotation shafts via transmission members such as gears. Instead, at least one of the heating roller 62 and the pressing roller 61 may be driven to rotate while being in contact with a driving roller different from the heating roller 62 and the pressing roller 61, so that the heating roller 62 and the pressing roller 61 may rotate independently. In this case, instead of or in addition to the heat source 62A, the heating roller 62 may receive heat from that driving roller that is in contact with the heating roller 62.

While rotating, the pressing roller 61 and the heating roller 62 have the same peripheral velocity. The pressing roller 61 and the heating roller 62 may not have completely the same peripheral velocity. The pressing roller 61 and the heating roller 62 are allowed to rotate at different peripheral velocities that differ within a range in which the recording medium P does not have a crease.

In a structure (referred to as a first structure below) where the heating roller 62 holds a recording medium P between itself and the pressing roller 61 while only one of the heating roller 62 and the pressing roller 61 is rotating, transportation force is exerted on one surface of the recording medium P, and a brake is applied to the other surface of the recording medium P. Thus, the recording medium P is more likely to have a crease.

In contrast, in the above modification example, the heating roller 62 holds the recording medium P between itself and the pressing roller 61 while both the heating roller 62 and the pressing roller 61 are rotating. Thus, the recording medium P is less likely to have a crease than in the first structure.

In the above modification example, while rotating, the pressing roller 61 and the heating roller 62 have the same peripheral velocity. Thus, the same transportation force is exerted on one surface and the other surface of the recording medium P. Thus, compared to a structure (referred to as a second structure below) where the pressing roller 61 and the heating roller 62 have different peripheral velocities while rotating, the recording medium P is less likely to have a crease. The second structure is a structure where, while rotating, the pressing roller 61 and the heating roller 62 have different peripheral velocities that cause creases in the recording medium P.

Modification Examples of Transportation Unit

In the present exemplary embodiment, the transport belt 65 is used as an example of the transportation unit, but this is not the only possible example. A transport member, such as a transport drum, that transports the recording medium P while coming into contact with the non-transfer surface of the recording medium P without being in contact with the transfer surface may be used as an example of the transportation unit.

A transportation unit having a contact member that comes into contact with the transfer surface of the recording medium P within a range that does not affect the image transferred to the recording medium P, such as a transport belt or a transport roller having a release layer, may be used as another example of the transportation unit.

The image forming apparatus may exclude a transport member that transports the recording medium P between the nip area 36T and the fixing device 60. In this case, the transfer belt 31 and the transfer roller 36 function as an example of the transportation unit.

When the effect on the image on the recording medium P is not considered, for example, when a device having the transport function and the transfer function or a transportation device having only the transport function is used as an example of the transportation device, transport members such as transport rollers that come into contact with both surfaces of the recording medium P may be used as an example of the transportation unit.

Second Exemplary Embodiment

Image Forming Apparatus 200

Figure 11:
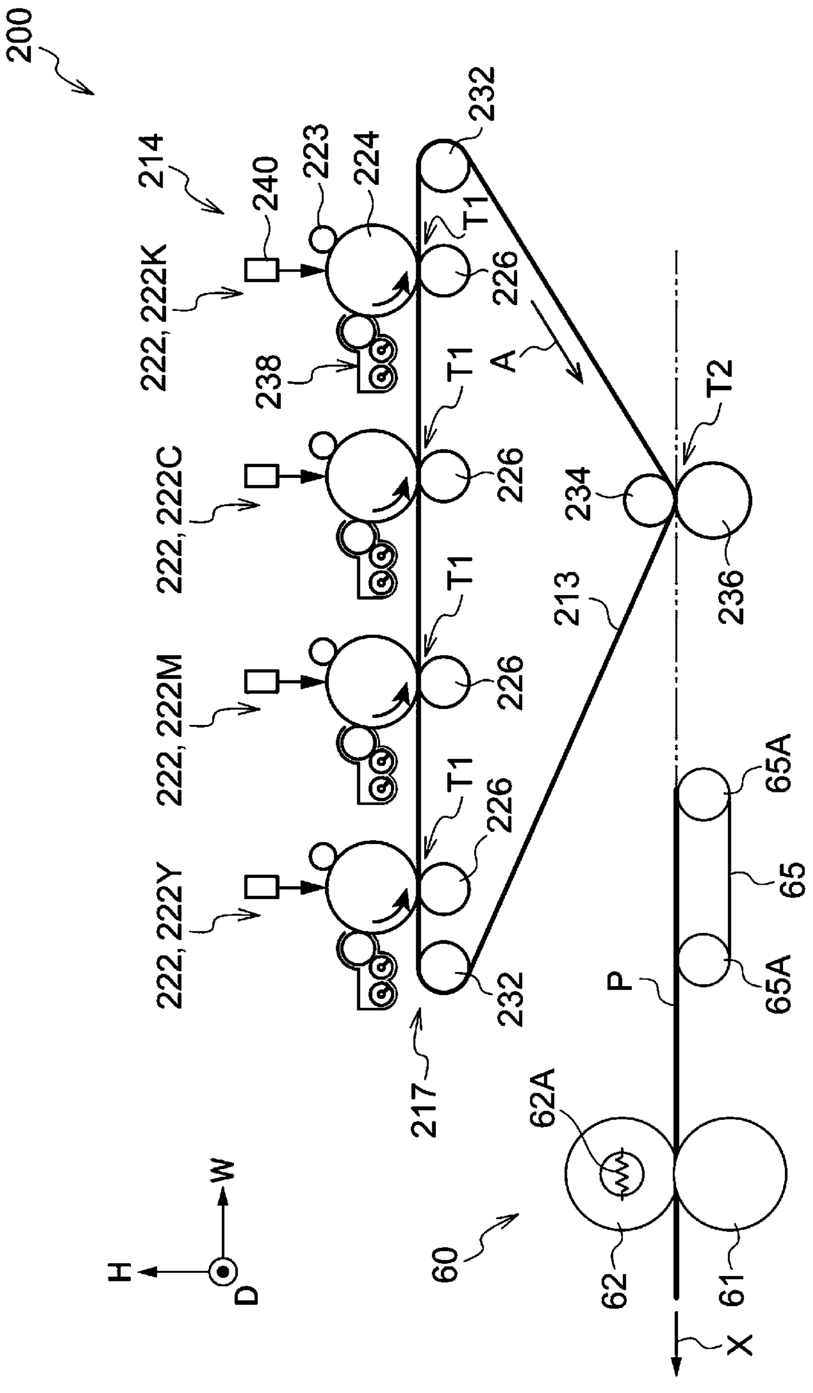
FIG. 11 is a schematic diagram of a structure of an image forming apparatus according to a second exemplary embodiment.

In the first exemplary embodiment, the image forming apparatus 10 is an inkjet-image forming apparatus that forms an image with ink on the recording medium P. However, this is not the only possible example of the image forming apparatus. For example, the image forming apparatus may be any device that forms images such as an electrophotographic image forming apparatus. In the second exemplary embodiment, an electrophotographic-image forming apparatus 200 will be described. FIG. 11 is a schematic diagram illustrating a structure of the image forming apparatus 200 according to the present exemplary embodiment. Components having the same functions as those of the first exemplary embodiment are denoted with the same reference signs without being described as appropriate.

Image Forming Unit 214

The image forming apparatus 200 includes an image forming unit 214 in place of the image forming unit 14. The image forming unit 214 is an example of an image forming unit that forms images on a recording medium. More specifically, the image forming unit 214 forms toner images (examples of an image) on a recording medium P with electrophotography. More specifically, as illustrated in FIG. 11, the image forming unit 214 includes toner image forming units 222 that form toner images, and a transfer device 217 that transfers the toner images formed by the toner image forming units 222 to the recording medium P.

Toner Image Forming Unit 222

The toner image forming units 222 illustrated in FIG. 11 form toner images of different colors. The present exemplary embodiment includes the toner image forming units 222 for four colors of yellow (Y), magenta (M), cyan (C), and black (K). The signs Y, M, C, and K appended to the reference sign 222 in FIG. 11 indicate the respective colors of the components.

The toner image forming units 222 for different colors have the same structure except for using different toner. Thus, as a representative, components of a toner image forming unit 222K of the toner image forming units 222 for different colors are denoted with reference signs in FIG. 11.

More specifically, the toner image forming unit 222 for each color includes a photoconductor 224 that rotates unidirectionally (for example, counterclockwise as in FIG. 11). The toner image forming unit 222 for each color includes a charging device 223, an exposure device 240, and a developing device 238.

In the toner image forming unit 222 for each color, the charging device 223 electrically charges the photoconductor 224. The exposure device 240 exposes the photoconductor 224 electrically charged by the charging device 223 to light to form an electrostatic latent image on the photoconductor 224. The developing device 238 develops the electrostatic latent image formed by the exposure device 240 on the photoconductor 224 into a toner image.

Transfer Device 217

The transfer device 217 illustrated in FIG. 11 is a device that transfers a toner image formed by each toner image forming unit 222 to a recording medium P. More specifically, the transfer device 217 first-transfers the toner images on the photoconductors 224 of different colors one on another on a transfer belt 213 serving as an intermediate transfer body, and second-transfers the superposed toner images to the recording medium P. More specifically, as illustrated in FIG. 11, the transfer device 217 includes the transfer belt 213, first transfer rollers 226, and a second transfer roller 236.

Each first transfer roller 226 transfers the toner image on the photoconductor 224 for the corresponding color to the transfer belt 213 at a first transfer position T1 between the photoconductor 224 and the first transfer roller 226. In the present exemplary embodiment, a first transfer electric field is applied between the first transfer roller 226 and the photoconductor 224 to transfer the toner image formed on the photoconductor 224 to the transfer belt 213 at the first transfer position T1.

The outer peripheral surface of the transfer belt 213 receives toner images from the photoconductors 224 of different colors. As illustrated in FIG. 11, the transfer belt 213 is endless and wound around multiple rollers 232 and an opposing roller 234 to form an inverted triangle when viewed from the front (when viewed in the apparatus depth direction). The transfer belt 213 rotates in the direction of arrow A in response to rotation of at least one of the multiple rollers 232.

The second transfer roller 236 transfers the toner image transferred to the transfer belt 213 to the recording medium P at a second transfer position T2 between the opposing roller 234 and the second transfer roller 236. In the present exemplary embodiment, a second transfer electric field is applied to between the opposing roller 234 and the second transfer roller 236, so that the toner image transferred to the transfer belt 213 is transferred to the recording medium P at the second transfer position T2.

Fixing Device 60

In the present exemplary embodiment, the fixing device 60 fixes the toner image transferred to the recording medium P by the second transfer roller 236 onto the recording medium P.

The heating roller 62 and the pressing roller 61 in the fixing device 60 transport the recording medium P while holding the recording medium P therebetween, and heat and press the recording medium P to fix the toner image transferred to the recording medium P onto the recording medium P. The fixing device 60 has the same structure as the first exemplary embodiment except that the fixing device 60 fixes the toner image transferred to the recording medium P onto the recording medium P.

Effect of Present Exemplary Embodiment

In the image forming apparatus 200, the toner image forming units 222 for different colors form toner images. The toner images formed by the toner image forming units 222 for different colors are first-transferred to the transfer belt 213 at the respective first transfer positions T1 in a superposed manner, and the superposed toner images are second-transferred to the recording medium P at the second transfer position T2.

As illustrated in FIG. 4 and FIG. 5, the recording medium P to which the toner images are transferred is transported to the nip area NP by the transport belt 65 while the heating roller 62 is located in the separate position. In the present exemplary embodiment, as illustrated in FIG. 4, the recording medium P is transported to the nip area NP along the pressing roller 61 after the leading end portion of the recording medium P first comes into contact with the pressing roller 61.

Subsequently, as illustrated in FIG. 6, the heating roller 62 moves from the separate position to the contact position to hold the recording medium P transported to the nip area NP by the transport belt 65 between itself and the pressing roller 61. Then, as illustrated in FIG. 7, the pressing roller 61 and the heating roller 62 transport the recording medium P while holding the recording medium P therebetween.

When the heating roller 62 and the pressing roller 61 heat and press the recording medium P while holding the recording medium P therebetween to transport the recording medium P, the toner image transferred to the recording medium P is fixed to the recording medium P.

In this manner, the recording medium P is transported to the nip area NP while the heating roller 62 is located in the separate position. Thus, the position of the leading end portion of the recording medium P is prevented from being constrained when the leading end portion enters between the pressing roller 61 and the heating roller 62. Thus, the recording medium P with a cockle or inclined with respect to the transport direction X may be restored. Thus, in the structure according to the present exemplary embodiment, the recording medium P is less likely to have a crease than in the first structure.

In the present exemplary embodiment, as described above, the heating roller 62 disposed above the pressing roller 61 moves between the contact position and the separate position. Thus, compared to the second structure, the recording medium P on the pressing roller 61 is less likely to move and less likely to have its position changed while being held. Thus, the recording medium P is less likely to have a crease than in the second structure.

The present disclosure is not limited to the above embodiments, and may be modified, changed, or improved in various manners within the scope not departing from the gist of the disclosure. For example, multiple modification examples may be combined as appropriate. Components according to the exemplary embodiments may each be a separate component or integrated with a surrounding component.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A transportation device, comprising:

a first transporter;

a second transporter movable toward and away from the first transporter between a contact position and a separate position to hold a to-be-transported object between the second transporter and the first transporter in the contact position; and a transportation unit that transports the to-be-transported object along the first transporter to a nip area where the first transporter and the second transporter hold the to-be-transported object therebetween while the second transporter is located in the separate position, wherein the second transporter is arranged on a side of a surface having an unfixed image transferred to the to-be-transported object, and moves from the separate position to the contact position, in a state where the to-be-transported object transported to the nip area by the transportation unit is in contact with and held by the first transporter, to hold the to-be-transported object between the second transporter and the first transporter to transport the to-be-transported object.

2. The transportation device according to claim 1, wherein a first movement speed at which the second transporter moves from the separate position to the contact position is higher than a second movement speed at which the second transporter moves from the contact position to the separate position.

3. The transportation device according to claim 1, wherein at least one of the first transporter and the second transporter is formed from an elastic body that is elastically deformed with a load imposed when the second transporter and the first transporter hold the to-be-transported object therebetween.

4. The transportation device according to claim 2, wherein at least one of the first transporter and the second transporter is formed from an elastic body that is elastically deformed with a load imposed when the second transporter and the first transporter hold the to-be-transported object therebetween.

5. The transportation device according to claim 1, wherein the second transporter holds the to-be-transported object between the second transporter and the first transporter within a period from when a leading end portion of the to-be-transported object enters the nip area to when the leading end portion finishes passing the nip area.

6. The transportation device according to claim 2, wherein the second transporter holds the to-be-transported object between the second transporter and the first transporter within a period from when a leading end portion of the to-be-transported object enters the nip area to when the leading end portion finishes passing the nip area.

7. The transportation device according to claim 3, wherein the second transporter holds the to-be-transported object between the second transporter and the first transporter within a period from when a leading end portion of the to-be-transported object enters the nip area to when the leading end portion finishes passing the nip area.

8. The transportation device according to claim 1, wherein, while the first transporter and the second transporter are rotating, the second transporter moves from the separate position to the contact position to hold the to-be-transported object between the second transporter and the first transporter.

9. The transportation device according to claim 8, wherein while rotating, the first transporter and the second transporter have the same peripheral velocity.

10. A fixing device as the transportation device according to claim 1, wherein the first transporter is either one of a heating member and a pressing member, and wherein the second transporter is the other one of the heating member and the pressing member.

11. The fixing device according to claim 10, wherein the second transporter holds the to-be-transported object formed from an ordinary paper sheet between the second transporter and the first transporter at a first load, and wherein the second transporter holds the to-be-transported object formed from a coated paper sheet between the second transporter and the first transporter at a second load heavier than the first load.

12. The fixing device according to claim 10, wherein the second transporter holds the to-be-transported object with a basis weight of smaller than a predetermined reference value between the second transporter and the first transporter at a first load, and wherein the second transporter holds the to-be-transported object with a basis weight of larger than or equal to the predetermined reference value between the second transporter and the first transporter at a second load heavier than the first load.

13. An image forming apparatus, comprising:

an image forming unit that forms an image on a recording medium; and a fixing device that includes:

a first transporter that is either one of a heating member and a pressing member;

a second transporter that is the other one of the heating member and the pressing member, and movable toward and away from the first transporter between a contact position and a separate position to hold a recording medium between the second transporter and the first transporter in the contact position; and a transportation unit that transports the recording medium along the first transporter to a nip area where the first transporter and the second transporter hold the recording medium therebetween while the second transporter is located in the separate position, wherein the second transporter is arranged on a side of a surface having an unfixed image transferred to the to-be-transported object, and moves from the separate position to the contact position, in a state where the recording medium transported to the nip area by the transportation unit is in contact with and held by the first transporter, to hold the recording medium between the second transporter and the first transporter to fix the image on the recording medium formed by the image forming unit onto the recording medium, wherein the second transporter holds the recording medium between the second transporter and the first transporter after a trailing end of the recording medium passes through the image forming unit.

14. A transportation device, comprising:

a first transporter;

a second transporter movable toward and away from the first transporter between a contact position and a separate position to hold a to-be-transported object between the second transporter and the first transporter in the contact position; and a transportation unit that transports the to-be-transported object to a nip area where the first transporter and the second transporter hold the to-be-transported object therebetween while the second transporter is located in the separate position, wherein the second transporter is arranged on a side of a surface having an unfixed image transferred to the to-be-transported object, and moves from the separate position to the contact position, in a state where the to-be-transported object is restored from having a cockle and is transported to the nip area by the transportation unit as being held by the first transporter, to hold the to-be-transported object between the second transporter and the first transporter to transport the to-be-transported object.

* * * * *